May 9, 1950          R. R. KAUFMAN          2,507,255
MEASURING DISPENSER WITH TIMER-ACTUATED
DRAINING AND REFILLING MEANS

Filed March 22, 1945          2 Sheets-Sheet 1

INVENTOR.
Robert R. Kaufman
BY
Evans + McCoy
ATTORNEYS

INVENTOR.
Robert R. Kaufman
BY
Evans + McCoy
ATTORNEYS

Patented May 9, 1950

2,507,255

UNITED STATES PATENT OFFICE 2,507,255

MEASURING DISPENSER WITH TIMER-ACTUATED DRAINING AND REFILLING MEANS

Robert R. Kaufman, Cleveland, Ohio, assignor to The Master Builders Company, Cleveland, Ohio, a corporation of Ohio Application March 22, 1945, Serial No. 584,059

17 Claims. (Cl. 222—70)

This invention relates to a liquid dispensing device that is particularly designed for delivering accurately measured amounts of a liquid solution to a concrete mixer.

In the mixing of concrete for various purposes it is common practice to add to the water certain chemicals that affect the properties of the concrete, such as dispersing agents to increase durability, or air entraining foaming agents to impart disconnected voids.

In order to obtain the best results with such admixtures or solutions, it is necessary that the water and added reagents be very accurately proportioned with respect to the cement in the mix.

The main objects of the present invention are to provide a liquid dispensing device which provides extremely accurate measurements for the liquid, and also to provide a device which is capable of delivering accurately measured charges in rapid succession.

With the above and other objects in view, the invention may be said to comprise the dispensing device as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
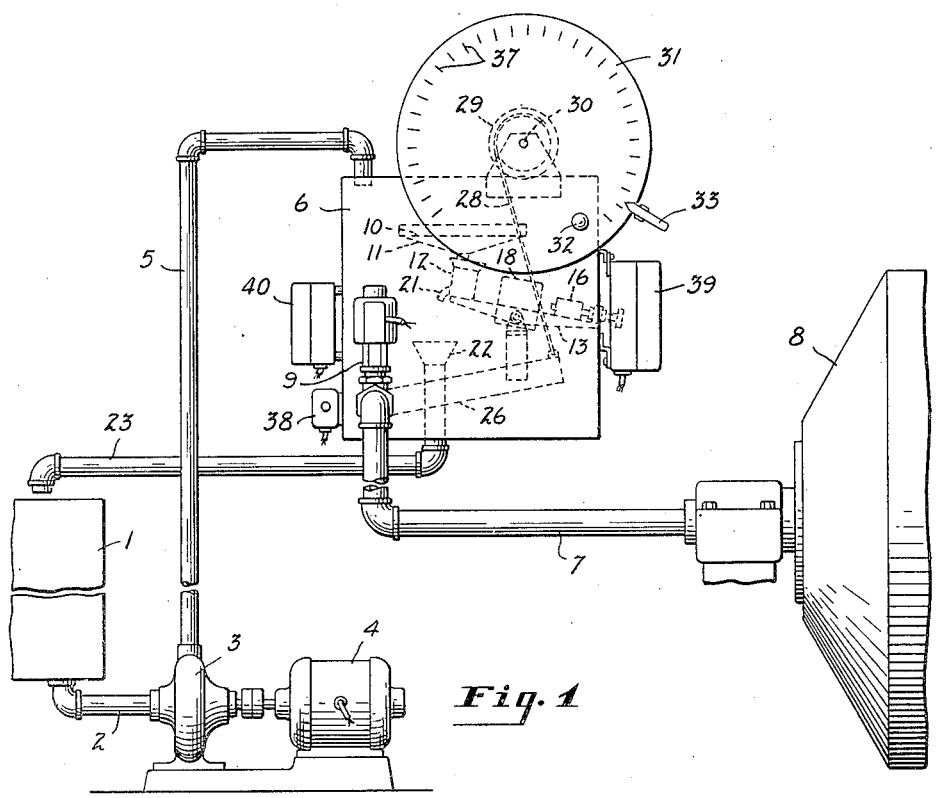
Figure 1 is a side elevation of apparatus embodying the invention.
Figure 2:
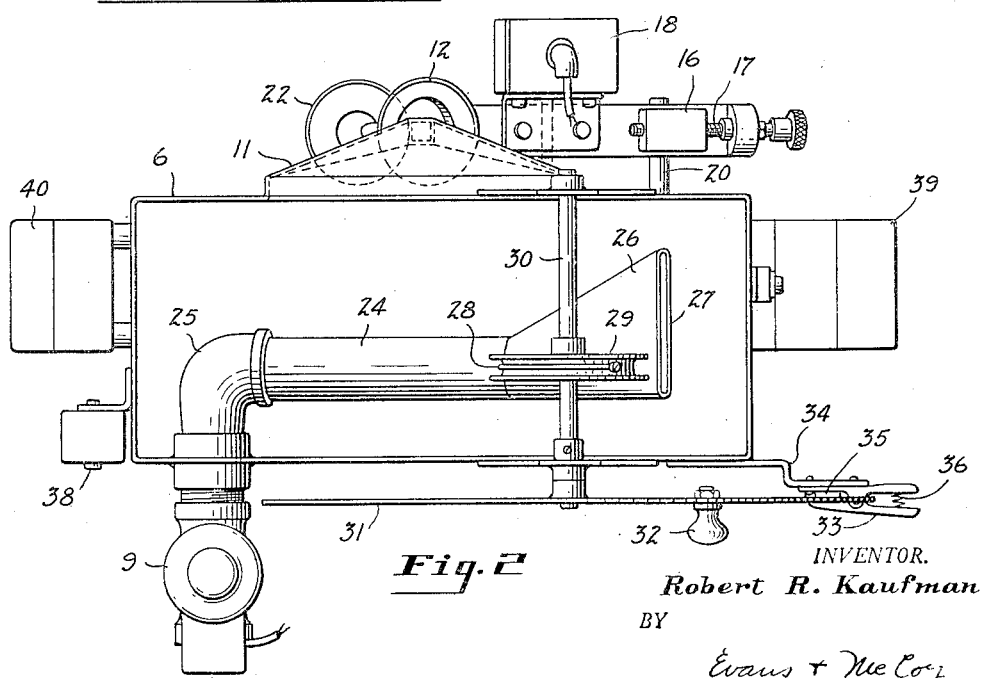
Fig. 2 is a top plan view of the measuring receptacle.
Figure 3:
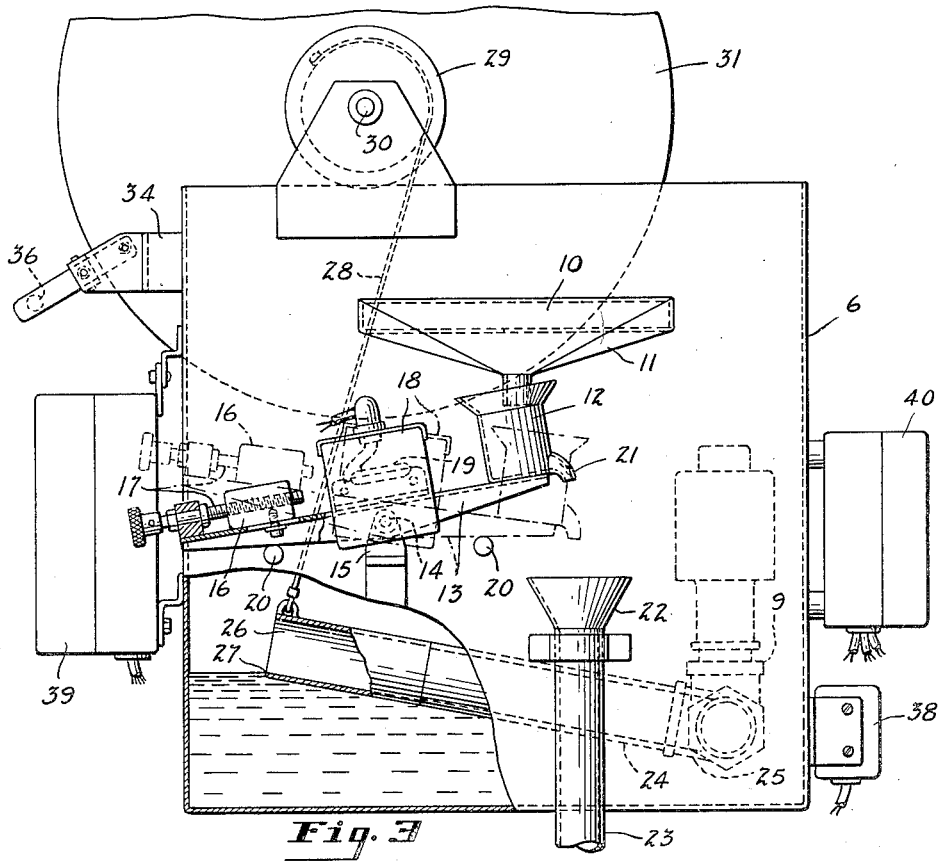
Fig. 3 is a side elevation of the measuring receptacle.

As shown in Fig. 1 of the drawings, the liquid solution or mixture which is to be delivered in measured charges may be stored in a suitable mixing and storage tank 1. The storage tank 1 is connected by a pipe 2 to a pump 3 operated by an electric motor 4 that delivers liquid through a pipe 5 to a measuring receptacle 6. A drain pipe 7 is connected to the lower portion of the receptacle 6 and may deliver to a concrete mixer 8. The pipe 7 is controlled by a suitable valve 9 which when opened permits discharge of liquid from the receptacle 6 to the mixer 8.

The receptacle 6 has an elongated overflow slot 10 in a side wall thereof adjacent the top, the slot being horizontally disposed so that liquid in excess of a predetermined amount will flow freely through the slot and quickly establish the level of the liquid in the receptacle at the horizontal bottom edge of the slot 10.

The liquid is discharged through the overflow slot 10 into an inclined trough 11 that discharges to a receptacle 12 that is mounted upon one end of a balance beam 13 that is mounted on a horizontal pivot 14 carried by a bracket 15 attached to the side wall of the receptacle 6. The end of the balance beam opposite that on which the receptacle 12 is mounted carries a counterweight 16 that may be adjusted by means of a screw 17, the weight 16 being sufficient to normally overbalance the receptacle 12 so as to hold the receptacle 12 in its uppermost position. When liquid is discharged into the receptacle 12 the weight of the receptacle and the liquid therein overbalances the weight 16 and the balance beam is tilted to an inclination opposite that in which it is normally held by the weight 16. The balance beam 13 serves to control the pump motor 4 to stop the motor when the receptacle 6 is filled, the balance beam 13 being provided with a casing 18 in which is mounted a mercury switch 19 that is normally closed but which is opened when the balance beam is tilted by liquid discharged into the receptacle 12. Stop pins 20 may be provided on the side walls of the receptacle 6 to limit rocking movements of the balance beam 13. The receptacle 12 is provided with a small outlet spout 21 adjacent its bottom through which liquid discharged into the receptacle 12 from the measuring receptacle 6 is discharged into a funnel shaped end 22 of a pipe 23 that delivers the liquid discharged from the receptacle 12 back into the storage tank 1.

The drain pipe 7 has a section 24 within the measuring receptacle 6 that is disposed at right angles to the pipe 7 and connected thereto by a swiveled elbow 25. At its outer end the pipe section 24 has an enlarged flaring end portion 26 that provides a laterally facing drain outlet with an elongated horizontally disposed bottom edge 27.

The slot 10 determines the uppermost level of the liquid in the receptacle 6 and the bottom edge 27 of the drain outlet determines the level of the liquid in the receptacle 6 after liquid supplied to the receptacle 6 has been drained to the mixer 8. By adjusting the pipe section 24 vertically, the horizontal edge 27 may be positioned at any desired distance below the horizontal slot 10 and by emptying the receptacle from the level established by the slot 10 to the level established by the bottom edge 27 of the drain opening, an accurately measured quantity of liquid may be discharged from the receptacle 6 by opening the valve 9. The cross sectional area of the drain outlet is greater than that of the pipe 7 so that when the valve 9 is opened the liquid can flow rapidly from the receptacle 6, and because of the elongated bottom edge 27 of the drain outlet the rapid discharge continues until the low liquid level in the receptacle is established.

For adjusting the swiveled drain section 24 a cable 28 is attached to the outer end of section 24 and to a sheave 29 attached to a shaft 30 that extends across the top of the receptacle 6. At the side of receptacle 6 opposite that on which the discharge slot 10 is provided, a large disk 31 is attached to the shaft 30 and this disk is provided with a handle 32 by means of which the disk and shaft may be turned to adjust the position of the drain outlet. Adjacent the periphery thereof the disk 31 is releasably engaged by a clamping member 33 that is pivoted to a bracket 34 attached to the receptacle 6, the clamping member 33 being actuated by a spring 36 in a direction to clamp the peripheral edge of the disk 31 against a friction pad 35 on the bracket 34. The disk may be released by pressing the outer end of the clamping member 33 inwardly against the spring 36, and after the disk has been adjusted to the desired position the clamping member 33 may be released to clamp the disk in adjusted position.

The disk 31 is of relatively large diameter and is provided with an accurately graduated peripheral scale 37 that indicates the quantity of liquid to be discharged. The clamping member 33 may serve as a pointer in connection with the scale 37 and the graduation of the scale 37 may be designated in terms of pounds of cement, the graduations being so disposed that a correct amount of liquid will be discharged for a mix having the designated quantity of cement.

In order to provide a maximum speed of operation, means is provided for opening the valve 9, holding it open for a predetermined time interval sufficient to permit a measured charge to drain from the receptacle 6, then closing the valve, starting the pump motor 4 to fill the tank and then automatically stopping the pump motor 4 when the tank is filled. By providing the sequence of operations above described successive charges may be delivered to the concrete mixer with maximum rapidity.

The cycle of operations referred to is started by means of a switch 38 of the push button type mounted on one end of the receptacle 6, the successive operations being controlled by a timer mechanism and a motor control mechanism mounted in casings 39 and 40 on the receptacle 6.

Figure 4:
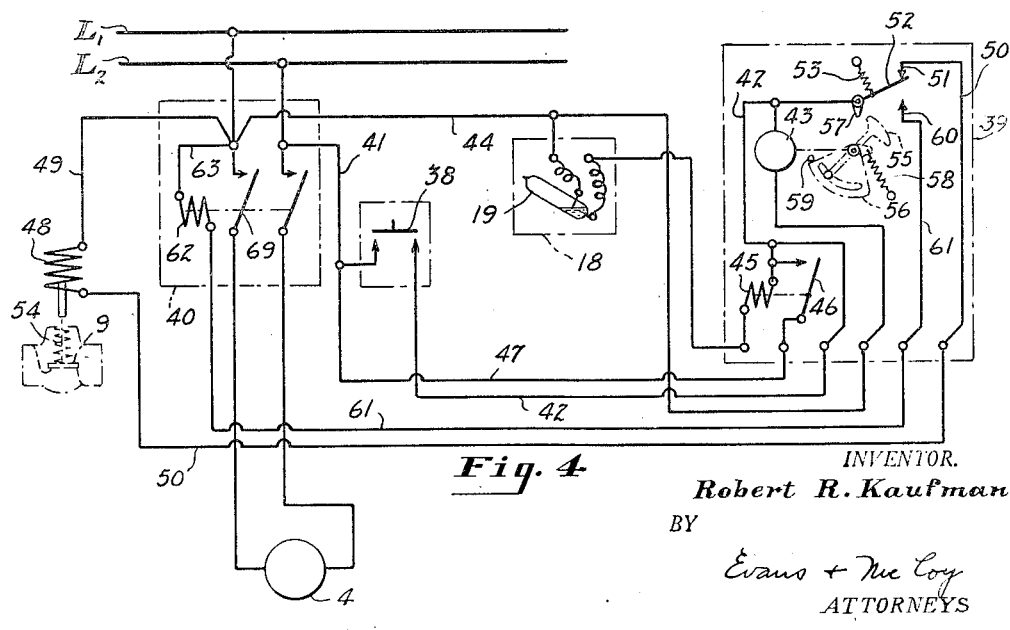
Fig. 4 is a wiring diagram showing the operating and controlling devices.

In Fig. 4 of the drawings, the starting switch 38 is shown connected to a line $L_2$ by a wire 41 and by a wire 42 to an actuating motor 43 in the casing 39, the motor 43 being connected by a wire 44 to a line $L_1$. A relay solenoid 45 is connected in series with the switch 19 between the wires 42 and 44 and operates a relay switch 46 that connects the wire 42 to a wire 47 that is connected to the wire 41 to short circuit the starting switch 38, the relay serving to maintain a flow of current to the motor 43 after the push button switch 38 is released. The push button switch 38 and relay 46 also establish a circuit through a solenoid 48 that opens the valve 9, the solenoid 48 being connected to line $L_1$ by a wire 49 and to the line $L_2$ by a wire 50, a contact 51, a switch 52 normally held in engagement with contact 51 by suitable means such as a spring 53, the wire 42, switch 46 and wires 47 and 41. A timing device operated by the motor 43 moves the switch 52 out of engagement with the contact 51 to deenergize the solenoid 48 after a predetermined time interval, whereupon the valve 9 is closed by suitable means such as the spring 54.

As diagrammatically illustrated in Fig. 4 the timing device may be in the form of a cam 55 carried by a segment 56 actuated by the motor 43 and engageable with an arm 57 attached to the switch 52. The segment 56 is normally held by a spring 58 in engagement with a stop 59 in a position such that the cam 55 is spaced from the arm 57. Upon energization of the motor 43 the segment 56 is turned in a counterclockwise direction to move the cam 55 toward the arm 57. Upon engagement of the cam 55 with the arm 57 the switch 52 is moved away from the contact 51 and is held by the peripheral portion of the cam in engagement with a contact 60 to start the pump motor. The cam 55 is adjustable on the segment 56 angularly about its axis of rotation to vary its initial distance from the arm 57 and vary the time interval during which the valve 9 is held open.

The contact 60 is connected by a wire 61 to a solenoid 62 that is connected to line $L_1$ by a wire 63. The solenoid 62 when energized operates a switch 69 to start the pump motor 4. The motor 4 continues to operate until the mercury switch 19 is opened by liquid overflowing through the slot 10 into the receptacle 12. Opening of the switch 19 breaks the circuit through the relay solenoid 45 permitting the switch 46 to open and break the circuit through the motors 43 and 4. When the motor 43 is deenergized the timing device is reset by the spring 58 and switch 52 is returned by the spring 53 into engagement with the contact 51, so that the valve 9 will again be opened upon actuation of the switch 38.

Only a few seconds are required for the delivery of liquid charge from the receptacle 6 and the refilling of the receptacle and as soon as the mercury switch 19 is returned to its normal position after being tilted by overflowing liquid the push button 38 may be operated to deliver another charge of liquid.

By reason of the wide horizontal overflow and drain orifices, accurate levels are established substantially instantaneously so that a minimum time is required for the filling and emptying operations. It will be apparent therefore that the device of the present invention provides a means of delivering accurately measured charges of liquid in very rapid succession.

It is to be understood that variations and modifications of the specific device herein shown and described for purposes of illustration may be made without departing from the spirit of the invention.

What I claim is:

1. A liquid dispensing device comprising a measuring receptacle having an outlet, a valve controlling said outlet, means including a pump for delivering liquid to said receptacle, a timing mechanism, means for opening said valve and starting said timing mechanism, means controlled by said timing mechanism for closing the valve after a predetermined time interval and then operating said pump, and liquid controlled means for stopping said pump and timing mechanism when the liquid reaches a predetermined level in said receptacle.

2. A liquid dispensing device comprising a measuring receptacle having an overflow outlet and a drain outlet, a valve controlling the drain outlet, means including a pump for delivering liquid to said receptacle, valve actuating means, a control device for causing said actuating means to open the valve and to close the same after a predetermined time interval, a motor for operating said pump, means controlled by said control device for energizing said motor after the valve is closed, and means controlled by liquid discharged through said overflow outlet for deenergizing said motor.

3. A liquid dispensing device comprising a measuring receptacle having an overflow outlet and a drain outlet, a valve controlling the drain outlet, means including a pump for delivering liquid to said receptacle, means for opening said valve, a motor for driving said pump, timing means for closing said valve and starting said motor, and means controlled by liquid discharged from said overflow outlet for stopping said motor.

4. A liquid dispensing device comprising a measuring receptacle having a drain outlet and an overflow outlet, a valve controlling the drain outlet, means including a pump for delivering liquid to said receptacle, a pump operating motor, a timing mechanism having an operating motor, means including a manually operable switch for opening said valve and energizing said timing motor, means controlled by said timing mechanism for closing said valve after a predetermined time interval, means controlled by said timing mechanism for energizing the pump motor after said valve has been closed, and means controlled by liquid discharged through said overflow outlet for deenergizing said motors.

5. A liquid dispensing device comprising a measuring receptacle having a drain outlet and an overflow outlet, a valve controlling the drain outlet, means including a pump for delivering liquid to said receptacle, a pump operating motor, a timing mechanism having an operating motor, electric circuits for energizing said motors, a manually operable starting switch, means controlled by said switch for opening said valve, a solenoid operated relay switch closed by said starting switch, a relay circuit for maintaining operation of the timing motor, means controlled by the timing mechanism for closing said valve, after a predetermined time interval and starting the pump motor after the valve is closed, a counterbalanced movably mounted receptacle into which liquid discharges from said overflow outlet, and a normally closed switch in the pump motor circuit that is operated by said movable receptacle.

6. A liquid dispensing device comprising a storage receptacle, a measuring receptacle having an overflow outlet and a drain outlet, means including a pump for delivering liquid from the storage receptacle to the measuring receptacle, a motor for operating said pump, a valve controlling the discharge of liquid through the drain outlet, means for opening and closing said valve and for automatically starting said motor after the valve is closed, means controlled by liquid discharged through the overflow outlet for stopping said motor and means for returning overflow liquid to the storage receptacle.

7. A liquid dispensing device comprising a measuring receptacle having a drain outlet, a normally closed valve controlling said outlet, means including a pump for delivering liquid to said receptacle, a solenoid for opening said valve, an electric motor for operating said pump, a normally open switch controlling said motor, a solenoid for closing said switch, a timing mechanism, a switch for energizing said timing mechanism and said valve solenoid, means controlled by said timing mechanism for deenergizing said valve solenoid after a predetermined time interval and then energizing said switch solenoid to operate the pump, and liquid controlled means operable when liquid reaches a predetermined level in said receptacle to deenergize said timing mechanism and pump motor.

8. A liquid dispensing device comprising a measuring receptacle having an overflow opening in a side wall, a trough positioned to receive liquid discharged through said opening, means including a pump for delivering liquid to the receptacle, a balance beam having a receptacle on one arm thereof positioned to receive liquid from said trough, means normally overbalancing said receptacle, a motor for driving said pump and means controlled by said balance beam for deenergizing said motor.

9. A liquid dispensing device comprising a measuring receptacle having an overflow opening in a side wall that is provided with an elongated horizontal bottom edge, a vertically movable receptacle in which overflowing liquid is received, means normally overbalancing said movable receptacle, means for delivering liquid to said measuring receptacle, and means controlled by said movable receptacle for discontinuing the delivery of liquid to the measuring receptacle.

10. A liquid dispensing device comprising a measuring receptacle having an overflow opening in a side wall that is provided with an elongated horizontal bottom edge, a balance beam having an arm with a receptacle thereon and a weighted arm normally overbalancing the receptacle, means for limiting the rocking movements of said beam, means for directing liquid overflowing from said measuring receptacle to said balance beam receptacle to cause the same to overbalance the weighted arm, and means including a mercury switch carried by the balance beam for controlling the delivery of liquid to the measuring receptacle.

11. A liquid dispensing device comprising a measuring receptacle having an overflow slot that has an elongated horizontal edge over which the liquid spills, a drain conduit attached to the receptacle adjacent the bottom thereof and having a vertically adjustable section within the receptacle that is provided with a laterally facing drain opening to the interior of the receptacle that has an elongated horizontally disposed bottom edge, a valve controlling said drain conduit, means for delivering liquid to said receptacle, and means controlled by liquid discharge through the overflow slot for discontinuing the delivery of liquid to said receptacle.

12. A liquid dispensing device comprising a measuring receptacle having an overflow slot that has an elongated horizontal edge over which the liquid spills, a drain conduit attached to the receptacle adjacent the bottom thereof and having a vertically adjustable section within the receptacle that is provided with a laterally facing drain opening to the interior of the receptacle that has an elongated horizontally disposed bottom edge, a valve controlling said drain conduit, means for adjusting said section vertically to vary the distance between the overflow slot and drain opening, and a position indicator associated with said adjusting means for indicating the position of adjustment of said vertically adjustable drain conduit section and the volume of liquid between the horizontally disposed edges of the overflow slot and the drain opening.

13. A liquid dispensing device comprising a measuring receptacle having an overflow slot that has an elongated horizontal edge over which the liquid spills, a drain conduit connected to the receptacle adjacent the bottom, said drain conduit having a section within the conduit pivoted to swing about a horizontal axis and having a drain opening spaced from said axis that is provided with an elongated bottom edge parallel to said horizontal axis, means for adjusting said swing section including an operating shaft, and means including a graduated disk attached to said shaft for indicating the position of the drain opening and the volume of liquid between the horizontally disposed edges of the overflow slot and drain opening.

14. A liquid dispensing device comprising a measuring receptacle having an outlet, a valve controlling said outlet, means including a pump for delivering liquid to said receptacle, a timing mechanism, means for opening said valve and starting said timing mechanism, means controlled by the timing mechanism for closing said valve after a predetermined time interval and then operating said pump, means for adjusting the timing mechanism to vary the time interval during which said valve is held open, and means for automatically stopping said pump upon accumulation of a predetermined volume of liquid in said measuring receptacle.

15. A liquid dispensing device comprising a measuring receptacle having an outlet, a valve controlling said outlet, means including a pump for delivering liquid to said receptacle, a timing mechanism, means for opening said valve and starting said timing mechanism, means controlled by the timing mechanism for closing said valve after a predetermined time interval and then operating said pump, means for automatically stopping said pump and timing mechanism upon accumulation of a predetermined volume of liquid in said measuring receptacle, and means for automatically resetting said timing mechanism after it is stopped.

16. A liquid dispensing device comprising a measuring receptacle having an outlet, a valve controlling said outlet, means including a pump for delivering liquid to said receptacle, a timing mechanism, means for opening said valve and starting said timing mechanism, means controlled by the timing mechanism for closing said valve after a predetermined time interval and then operating said pump, means for adjusting the timing mechanism to vary the time interval during which said valve is held open, means for automatically stopping said pump upon accumulation of a predetermined volume of liquid in said measuring receptacle, and means for automatically resetting said timing mechanism after it is stopped.

17. A liquid dispensing device comprising a measuring receptacle having an overflow outlet and a drain outlet, means including a pump for delivering liquid to the measuring receptacle, a motor for operating said pump, a valve controlling the discharge of liquid through said drain outlet, a timing mechanism, means for opening said valve and starting said mechanism, means controlled by said timing mechanism for closing said valve and for starting said motor after the valve is closed, and means controlled by liquid discharge through the overflow outlet for stopping said motor.

ROBERT R. KAUFMAN.

REFERENCES CITED

The following references are of record in the file of this patent:

UNITED STATES PATENTS

| Number | Name | Date |
| --- | --- | --- |
| 1,231,006 | Flint | June 26, 1917 |
| 1,930,618 | Jones et al. | Oct. 17, 1933 |
| 1,938,922 | Meyer | Dec. 12, 1933 |
| 2,035,083 | Mattern | Mar. 24, 1936 |
| 2,284,880 | Nicholsen | June 2, 1942 |
| 2,321,573 | Chace | June 15, 1943 |